(12) United States Patent
Chen et al.

(10) Patent No.: US 8,813,596 B2
(45) Date of Patent: Aug. 26, 2014

(54) BALL SCREW WITH A CIRCULATING ASSEMBLY

(75) Inventors: Sin-He Chen, Taichung (TW); Dian-Yu Jhan, Taichung (TW)

(73) Assignee: Hiwin Technologies Corporation, Taichung (TW)

( * ) Notice: Subject to any disclaimer, the term of this patent is extended or adjusted under 35 U.S.C. 154(b) by 494 days.

(21) Appl. No.: 13/016,993

(22) Filed: Jan. 29, 2011

(65) Prior Publication Data
US 2012/0192667 A1 Aug. 2, 2012

(51) Int. Cl.
*F16H 1/24* (2006.01)
*F16H 55/02* (2006.01)

(52) U.S. Cl.
USPC .................................... 74/424.82; 74/424.86

(58) Field of Classification Search
USPC ......................................... 74/424.82–424.87
See application file for complete search history.

(56) References Cited

U.S. PATENT DOCUMENTS

| | | | | |
|---|---|---|---|---|
| 6,561,053 B2 * | 5/2003 | Greubel | ...................... | 74/424.87 |
| 7,810,406 B2 * | 10/2010 | Chen | .......................... | 74/424.86 |
| 8,408,087 B2 * | 4/2013 | Michioka et al. | .......... | 74/424.87 |
| 2007/0240532 A1 * | 10/2007 | Osterlanger et al. | ....... | 74/424.87 |
| 2008/0053260 A1 * | 3/2008 | Liao et al. | .................. | 74/424.87 |
| 2008/0098840 A1 * | 5/2008 | Chen | .......................... | 74/424.87 |
| 2008/0115609 A1 * | 5/2008 | Tsou et al. | ................. | 74/424.87 |
| 2008/0190231 A1 * | 8/2008 | Chiu et al. | ................. | 74/424.86 |
| 2008/0210038 A1 * | 9/2008 | Minakuchi | ................. | 74/424.87 |
| 2010/0236345 A1 * | 9/2010 | Miyahara et al. | .......... | 74/424.83 |
| 2010/0307272 A1 * | 12/2010 | Chen et al. | ................. | 74/424.87 |
| 2012/0192667 A1 * | 8/2012 | Chen et al. | ................. | 74/424.82 |

* cited by examiner

*Primary Examiner* — Troy Chambers
*Assistant Examiner* — Alexander Vu
(74) *Attorney, Agent, or Firm* — Wang Law Firm, Inc.; Li K. Wang; Stephen Hsu (57) ABSTRACT

A ball screw with a circulating assembly is disclosed. The circulating assembly of the ball screw is divided into a first circulating block and a second circulating block and can be assembled on the ball screw in such a method that the first and the second circulating blocks are assembled separately, so that the circulating assembly is applicable to the screw shaft whose helical groove doesn't extend to the shoulder portion thereof. In addition, the circulating assembly is limited in terms of an angle, and the relation between the first circulating block and the second circulating block is especially limited, so that the ball screw is applicable to the nuts with smaller outer diameter. Hence, the ball screw can be applied to both the nuts with smaller diameter and the screw shafts whose helical groove doesn't extend to the shoulder portion thereof.

7 Claims, 9 Drawing Sheets

BALL SCREW WITH A CIRCULATING ASSEMBLY

BACKGROUND OF THE INVENTION

1. Field of the Invention

The present invention relates to a ball screw, and more particularly to a ball screw with a circulating assembly.

2. Description of the Prior Art

Figure 1:
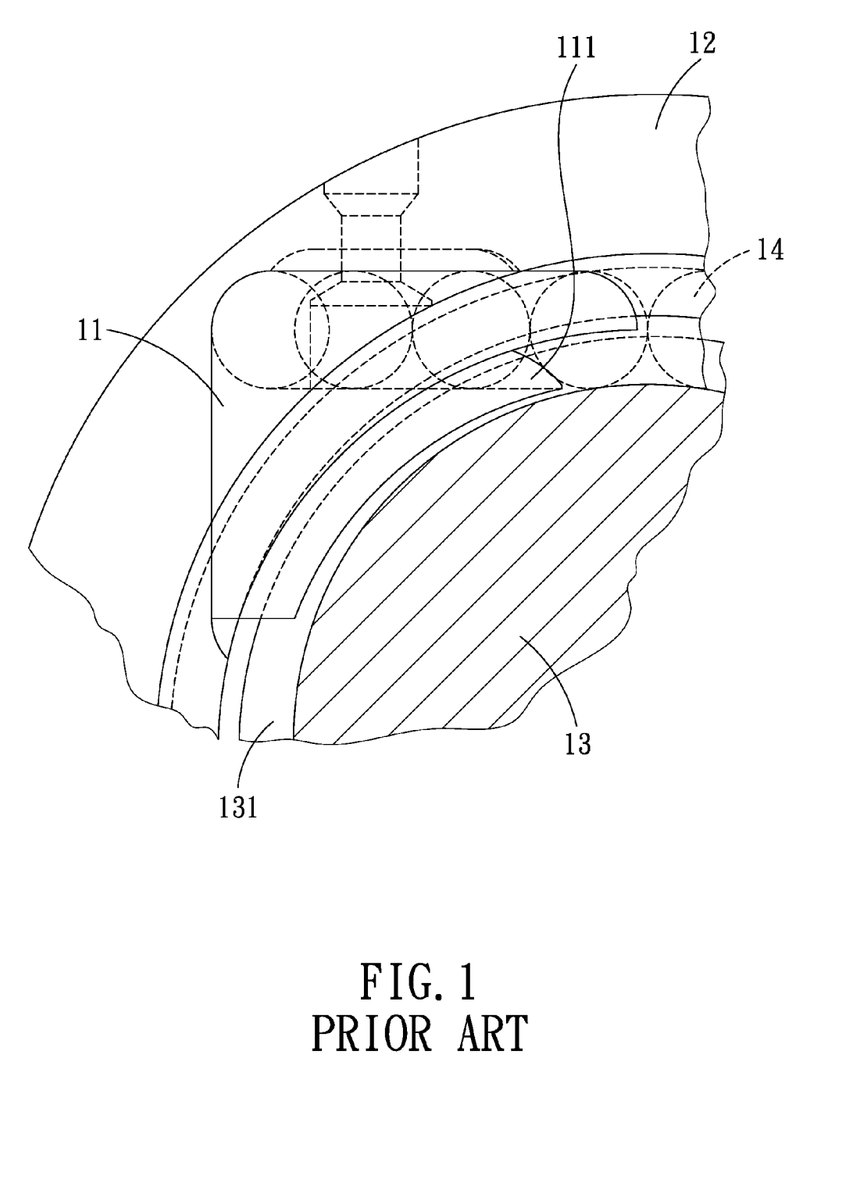
FIG. 1 is a schematic view showing a part of a first conventional ball screw.

Referring to FIG. 1 showing a first conventional ball screw with a circulating element, the circulating element 11 is axially installed into an end surface of the nut 12 and includes a nail portion 111. The nail portion 111 protrudes from the circulating element 11 and into the outer helical groove 131 of the screw shaft 13 for connecting the outer helical groove 131 of the screw shaft 13 to the circulating element 11. The circulating element 11 can guide the balls 14 into the circulating hole (not shown) in the nut 12 to allow the balls 14 between the screw shaft 13 and the nut 12 to circulate endlessly and eliminate the impact caused by the circulation of the balls 14. However, since the outer helical groove 131 of the screw shaft 13 and the nail portion 111 of the circulating element 11 are fitted in a concave-convex manner, so that one end of the outer helical groove 131 of the screw shaft 13 must be open. In other words, the outer helical groove 131 of the screw shaft 13 must extend to the shoulder portion of the screw shaft 13, thus reducing the service life of the ball screw.

Figure 2:
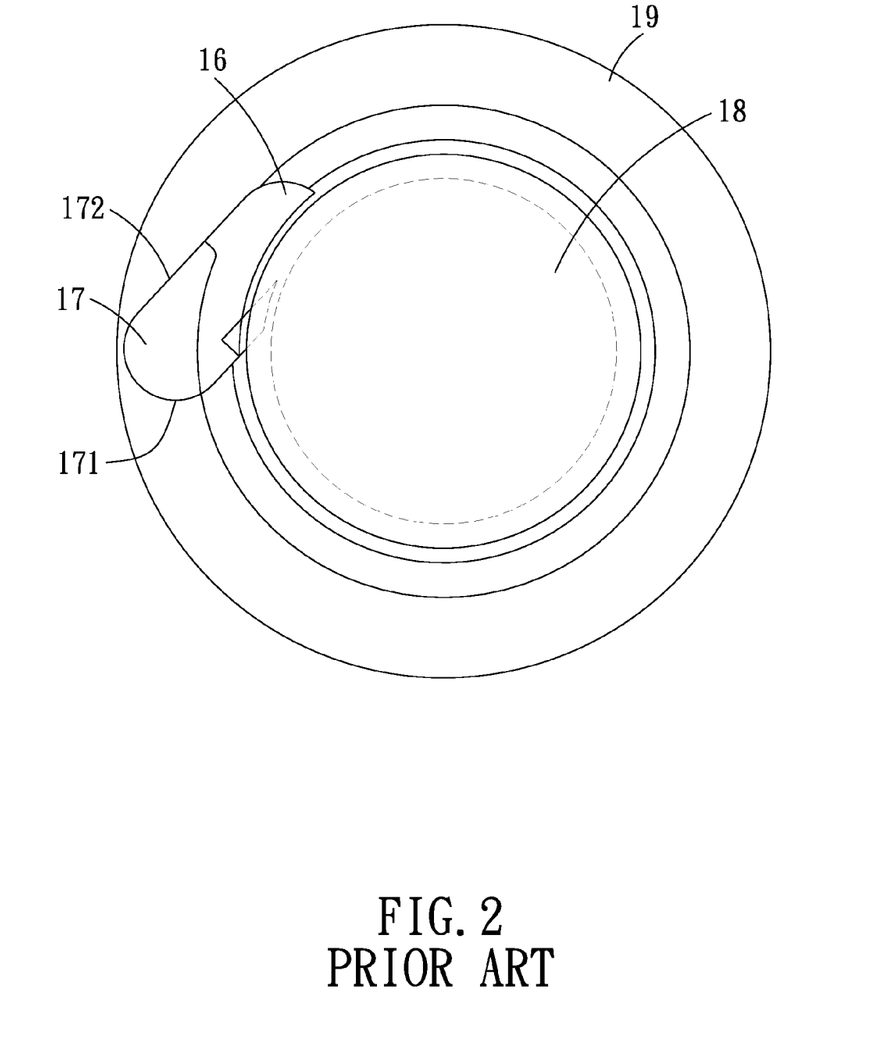
FIG. 2 is a schematic, view of a second ball screw.

Referring to FIG. 2 showing a second conventional ball screw with circulating assembly, the circulating assembly is of the sectional type, namely it consists of an inner circulating block 16 and an outer circulating block 17 so that it can be applied to the screw shaft 18 whose helical groove doesn't extend to the shoulder portion thereof. However, since the top surface 171 and the bottom surface 172 of the outer circulating block 17 are both planar and parallel to each other without any angle therebetween, such a structure must cooperate with a nut 19 with a larger outer diameter and is thus not applicable to the nuts of special specifications, especially the nuts by European industrial standards, such as the nuts by Deutsche industry norm.

The present invention has arisen to mitigate and/or obviate the afore-described disadvantages.

SUMMARY OF THE INVENTION

The primary objective of the present invention is to provide a ball screw with a circulating assembly which can be applied to both the nuts with smaller outer diameter and the screw shaft whose helical groove doesn't extend to the shoulder portion thereof.

Hence, to achieve the above objective, a ball screw with a circulating assembly in accordance with the present invention comprises a screw shaft, a nut and a circulating assembly. The screw shaft includes an axis and an outer helical groove in an outer surface thereof around the axis of the screw shaft. The nut is mounted on the screw shaft along the axis of the screw shaft and includes an inner helical groove in an inner surface thereof around the axis of the screw shaft. The inner helical groove cooperates with the outer helical groove to define a loaded path for receiving a plurality of balls. The nut further includes a circulating hole in communication with the inner helical groove, and a recess which is formed in an end surface thereof along the axis of the screw shaft. The recess includes a bottom surface and a side surface which the circulating hole penetrates.

The circulating assembly is disposed in the recess of the nut along the axis of the screw shaft and divided into a first circulating block and a second circulating block along the axis of the screw shaft. The first circulating block includes a top surface, and a first dividing surface opposite the top surface. The second circulating block includes a second dividing surface which is planar and abuts against the first dividing surface, and a bottom surface which is planar and abuts against the bottom surface of the recess. Between the bottom surface of the second circulating block and the second dividing surface of the second circulating block is defined, an angle. A maximum distance between the first dividing surface and the top surface of the first circulating block is denoted as HC1 while a maximum distance between the second dividing surface and the bottom surface of the second circulating block is denoted as HC2, and they satisfying the relation: HC2>HC1.

By such arrangements, since the circulating assembly of the present invention is divided into the first circulating block and the second circulating block, it can be assembled on the ball screw in such a method that the first circulating block which has a nail portion which is prone to causing interference is placed between the screw shaft and the nut first, and then the second circulating block is assembled on the nut in the axial direction of the nut. Hence, the ball screw of the present invention can be applied to the screw shaft whose outer helical groove shaft doesn't extend to the shoulder portion thereof.

Furthermore, the present invention is further limited in the circulating assembly having an angular design, and the HC1 and HC2 are further limited to satisfying the relation: HC2>HC1, hence, the present invention can be applied to the nuts with smaller outer diameter, satisfying the requirements of the new or old forms of nuts.

DETAILED DESCRIPTION OF THE PREFERRED EMBODIMENT

Referring to FIGS. 3-7, a ball screw with a circulating assembly in accordance with a preferred embodiment of the present invention is illustrated and comprises: a screw shaft 20, a nut 30, and a circulating assembly.

Figure 3:
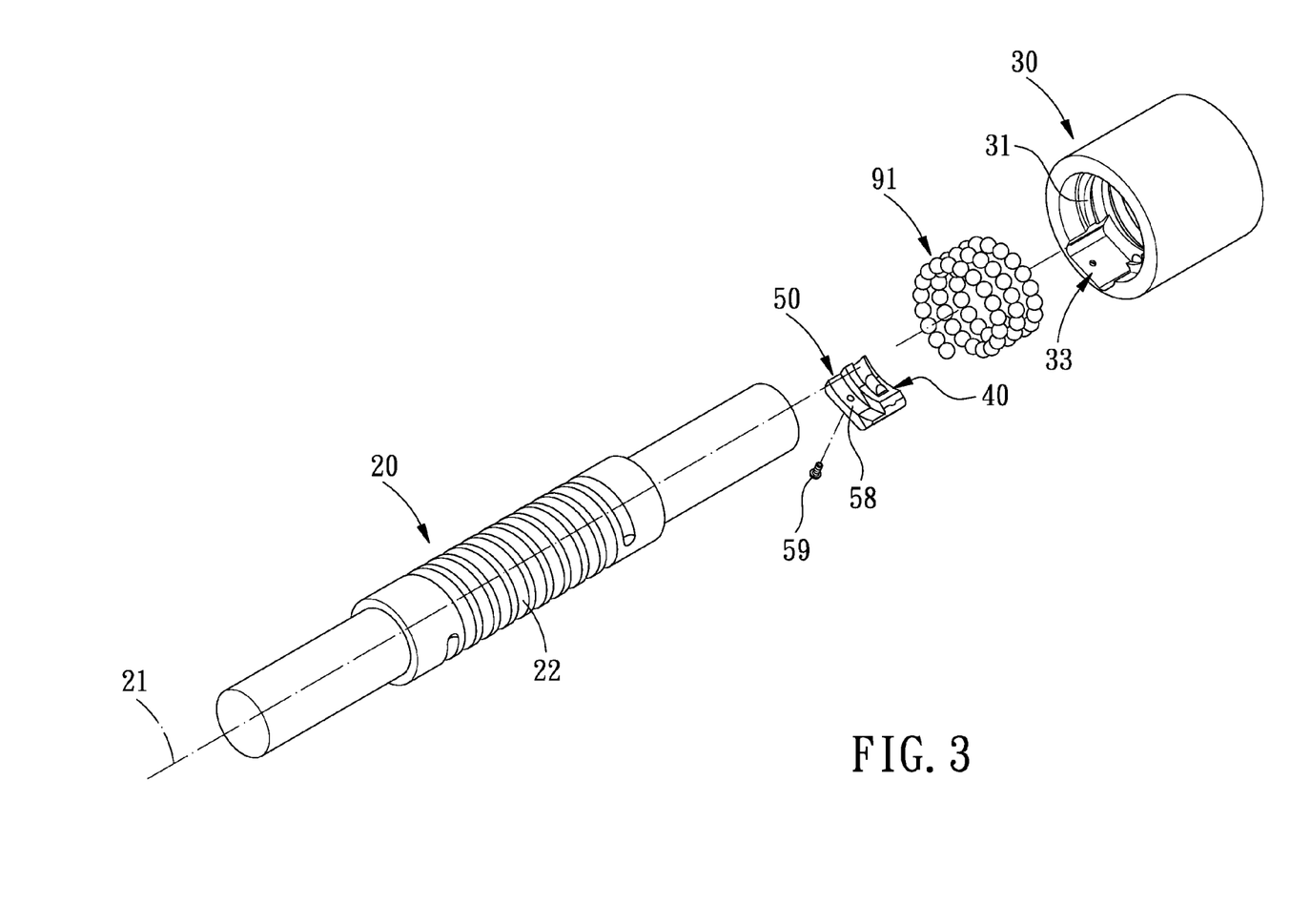
FIG. 3 is an exploded view of a ball screw with a circulating assembly in accordance with the present invention.

The screw shaft 20 includes an axis 21 and an outer helical groove 22 in an outer surface thereof around the axis 21. Both ends of the outer helical groove 22 can be closed (which means that the helical groove 22 of the screw shaft 20 doesn't extend to the shoulder portion of the screw shaft 20) or open (which means that the helical groove 22 of the screw shaft 20 extends to the shoulder portion of the screw shaft 20). In the present embodiment, both ends of the helical groove 22 are closed.

Figure 4:
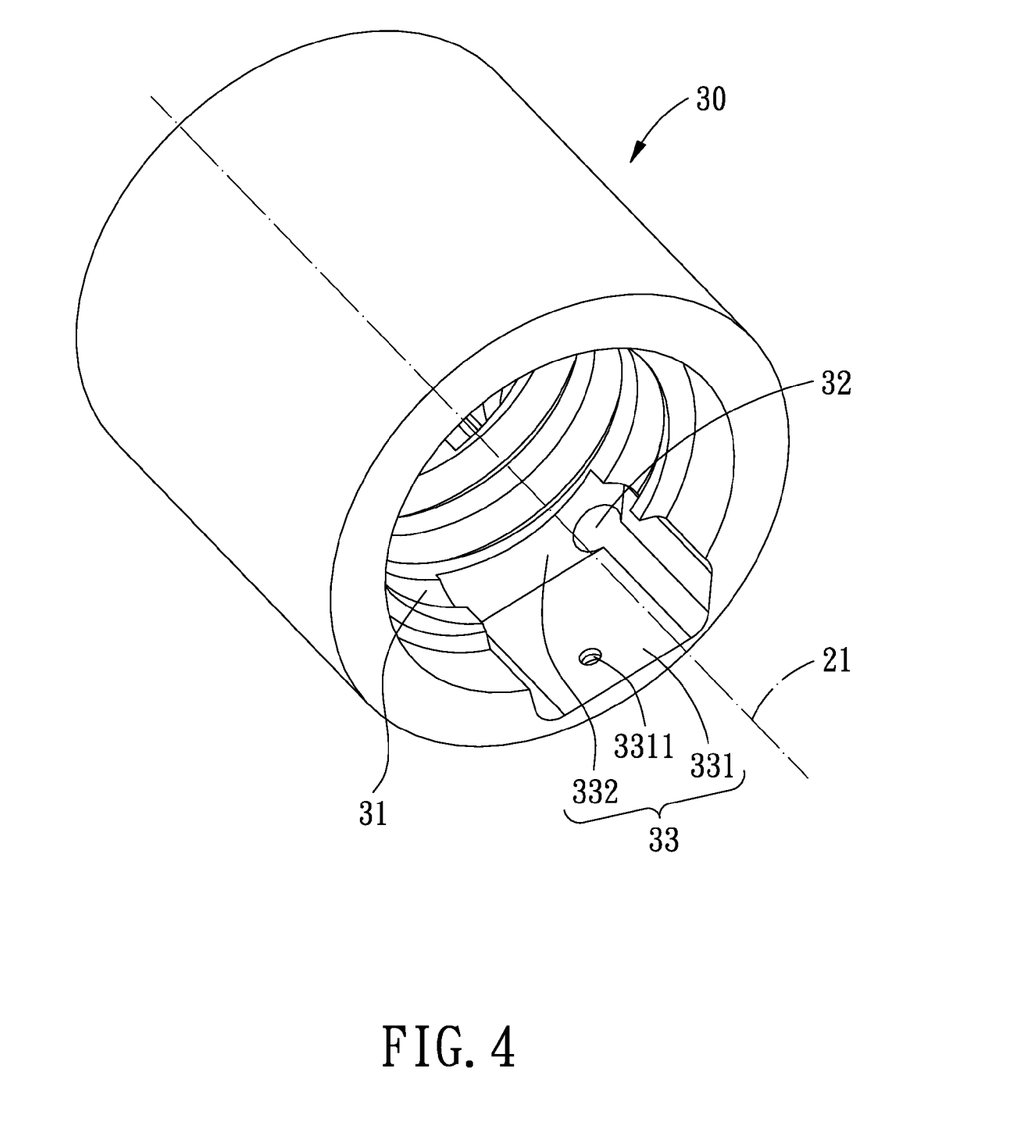
FIG. 4 is a perspective view of a nut for the ball screw with a circulating assembly in accordance with the present invention.

The nut 30 is mounted on the screw shaft 20 along the axis 21 and includes an inner helical groove 31 in an inner surface thereof around the axis 21. The inner helical groove 31 cooperates with the outer helical groove 22 to define a loaded path for receiving a plurality of balls 91. The nut 30 further includes a circulating hole 32 in communication with the inner helical groove 31, and a recess 33 formed in an end surface thereof along the axis 21 and located correspondingly to the outer helical groove 22 and the circulating hole 32. The recess 33 includes a bottom surface 331 opposite the outer helical groove 22 and a side surface 332 which the circulating hole 32 penetrates.

Figure 5:
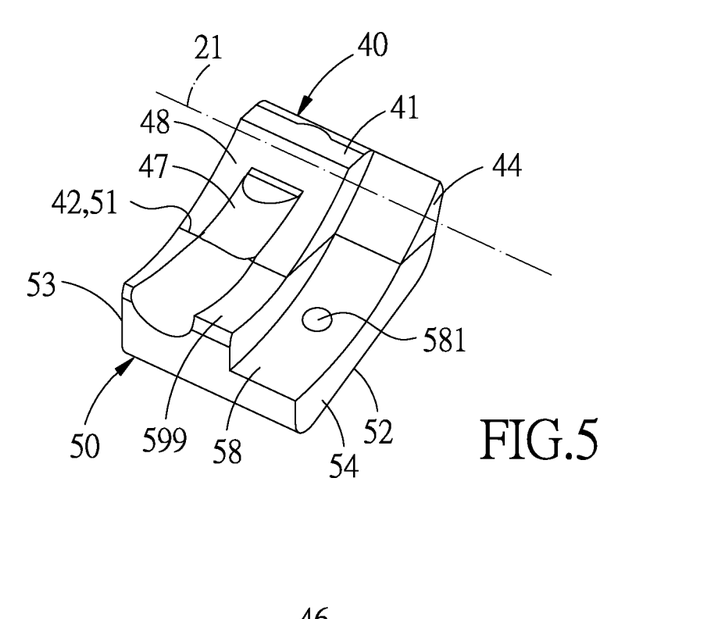
FIG. 5 is an assembly view of a circulating assembly for the ball screw in accordance with the present invention.
Figure 6:
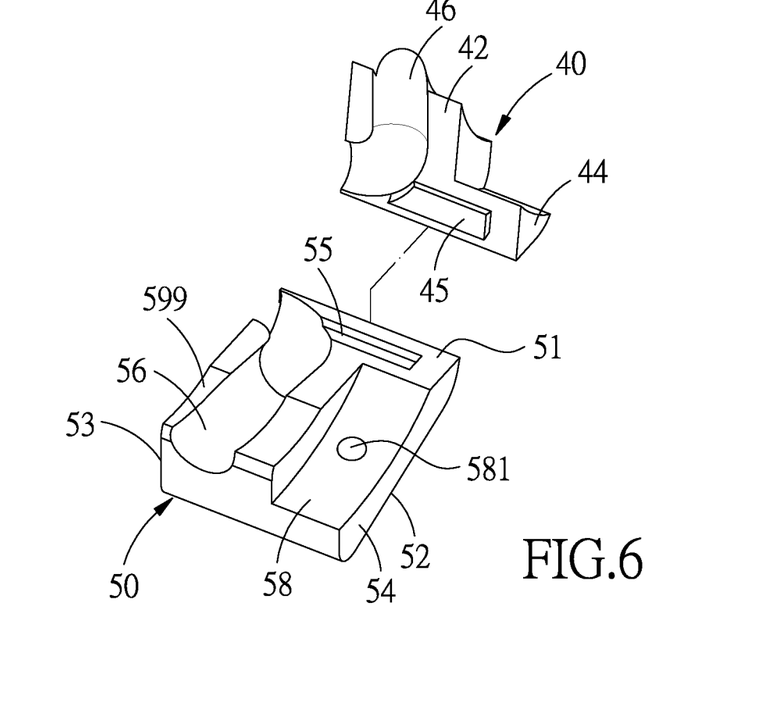
FIG. 6 is an exploded view of the circulating assembly for the ball screw in accordance with the present invention.

The circulating assembly is disposed in the recess 33 of the nut 30 along the axis 21 and divided into a first circulating block 40 and a second circulating block 50 along the axis 21, in other words, the circulating assembly is divided into the first circulating block 40 and the second circulating block 50 from an abutting surface thereof (a surface of the circulating assembly which abuts against the side surface 332 of the recess 33) to an end surface thereof (a surface of the circulating assembly opposite to the abutting surface).

Figure 7:
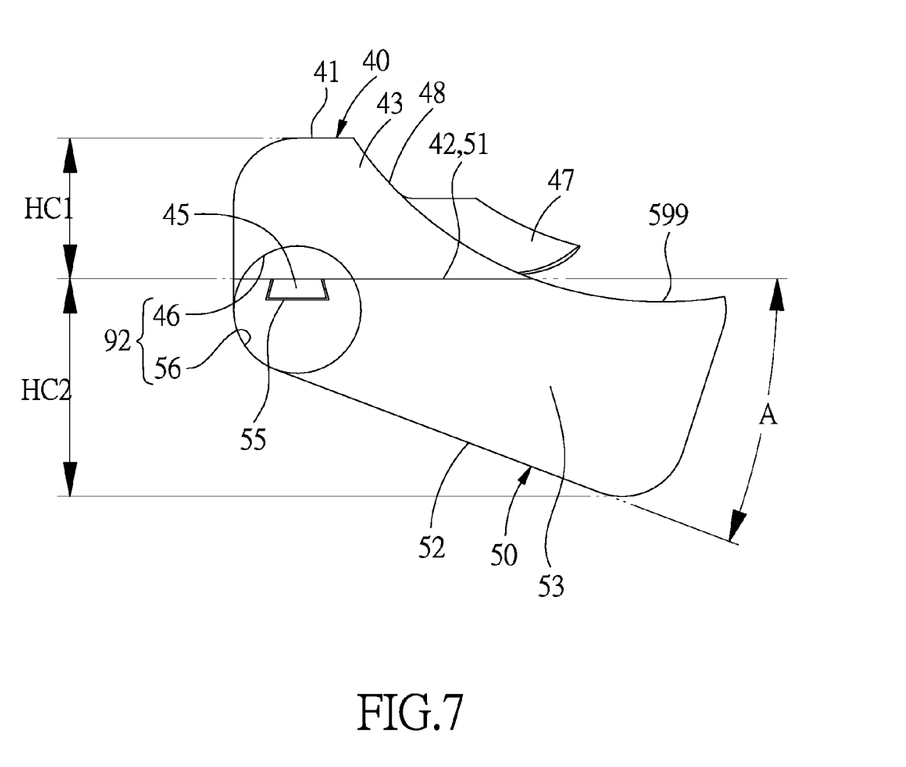
FIG. 7 is a side assembly view of the circulating assembly for the ball screw in accordance with the present invention.

The first circulating block 40 includes a top surface 41, and a first dividing surface 42 opposite the top surface 41. The second circulating block 50 includes a second dividing surface 51 which is planar and abuts against the first dividing surface 42, and a bottom surface 52 which is planar and abuts against the bottom surface 331 of the recess 13. Between the bottom surface and the second dividing surface 51 is defined an angle A ranging from 18 to 25 degrees. The maximum distance between the first dividing surface 42 and the top surface 41 is denoted as HC1 while the maximum distance between the second dividing surface 51 and the bottom surface 52 is denoted as HC2, and they satisfy the relation: HC2>HC1.

In addition, the bottom surface 52 of the second circulating block 50 abuts against the bottom surface 331 of the recess 33, and between the second dividing surface 51 and the bottom surface 52 is formed a second abutting surface 53 abutting against the side surface 332 of the recess 33. Between the first dividing surface 42 and the top surface 41 of the first circulating block 40 is formed a first abutting surface 43 which is located on the same plane as the second abutting surface 53. The first abutting surface 43 cooperates with the second abutting surface 53 to define the abutting surface of the circulating assembly. The first circulating block 40 includes a first end surface 44 opposite the first abutting surface 43 while the second circulating block 50 includes a second end surface 54 which is opposite the second abutting surface 53 and located on the same plane as the first end surface 44. The first end surface 44 cooperates with the second end surface 54 to define the end surface of the circulating assembly.

Furthermore, the first circulating block 40 is formed with a positioning portion 45 protruding from the first dividing surface 42, and the second circulating block 50 is farmed with a positioning concave 55 recessed in the second dividing surface 51 toward the bottom surface 52 for engagement with the positioning portion 45. The positioning portion 45 and the positioning concave 55 can be configured as desired, and in the present embodiment, the positioning portion 45 and the positioning concave 55 are, for example, a dovetail block and a dovetail groove.

Moreover, the first circulating block 40 further includes a first curved surface 48 connected between the top surface 41 and the first dividing surface 42, a first circulating channel 46 recessed into the first dividing surface 42 toward the top surface 41, and a nail portion 47 disposed in the helical groove 22 of the screw shaft 20 and located on the first curved surface 48. The second circulating block 50 further includes a second curved surface 599 with the same curvature as the first curved surface, a second circulating channel 56 recessed in the second dividing surface 51 toward the bottom surface 52. The first circulating channel 46 cooperates with the second circulating channel 56 to define a circulating channel 92 in communication with the circulating hole 32 and the loaded path, and a circular outer profile of the circular circulating channel 92 is connected to the bottom surface 52 of the second circulating block 50.

Additionally, the bottom surface 331 of the recess 33 includes a threaded groove 3311, and the second circulating block 50 further includes a protruding ear 58. The protruding ear 58 includes a locking hole 581 in alignment with the threaded groove 3311 of the nut. A screw 59 is screwed into the threaded groove 3311 by cooperating with the locking hole 581 of the protruding ear 58.

The aforementioned is the summary of the positional and structural relationship of the respective components of the preferred embodiment in accordance with the present invention.

For a better understanding of the present invention, its operation and function, reference should be made to the following description:

The present invention is applicable to the screw shaft whose helical groove doesn't extend to the shoulder portion thereof.

Figure 8:
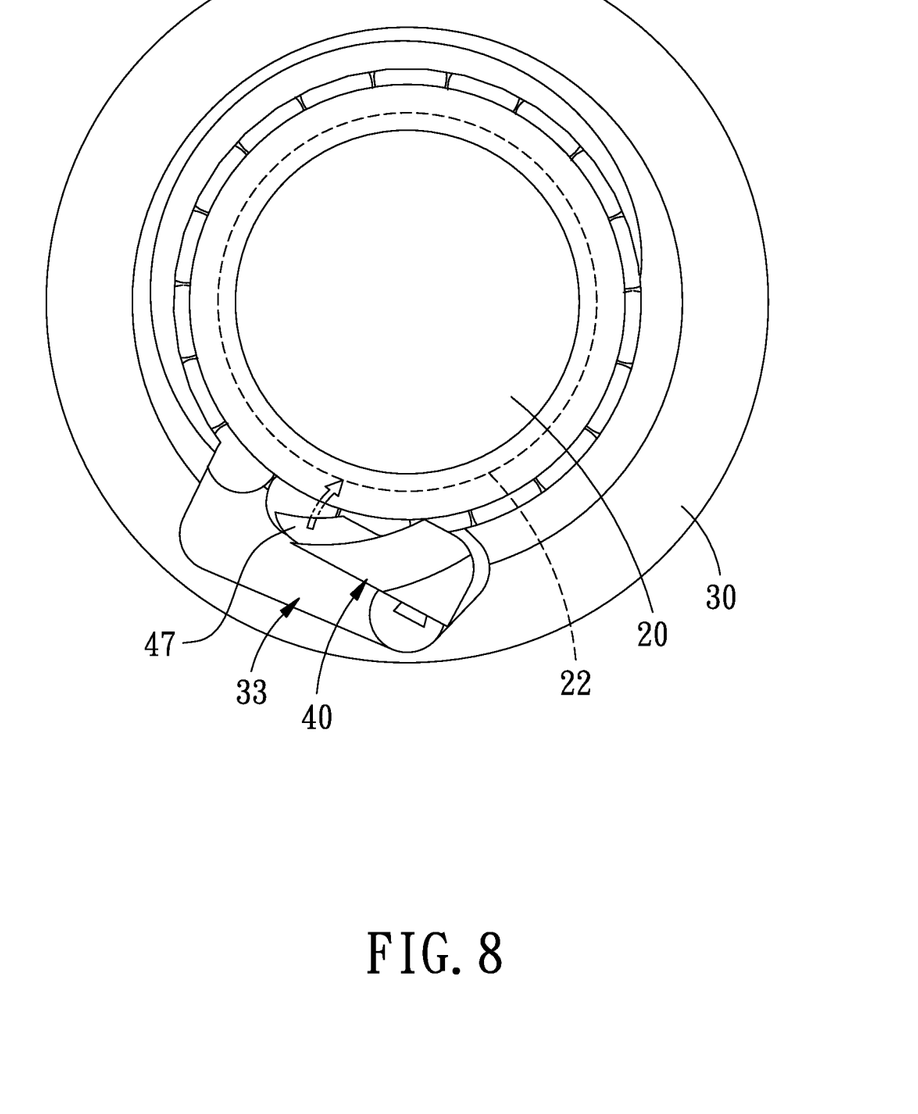
FIG. 8 is an operational view showing that the first circulating block is axially placed in the nut in accordance with the present invention.
Figure 9:
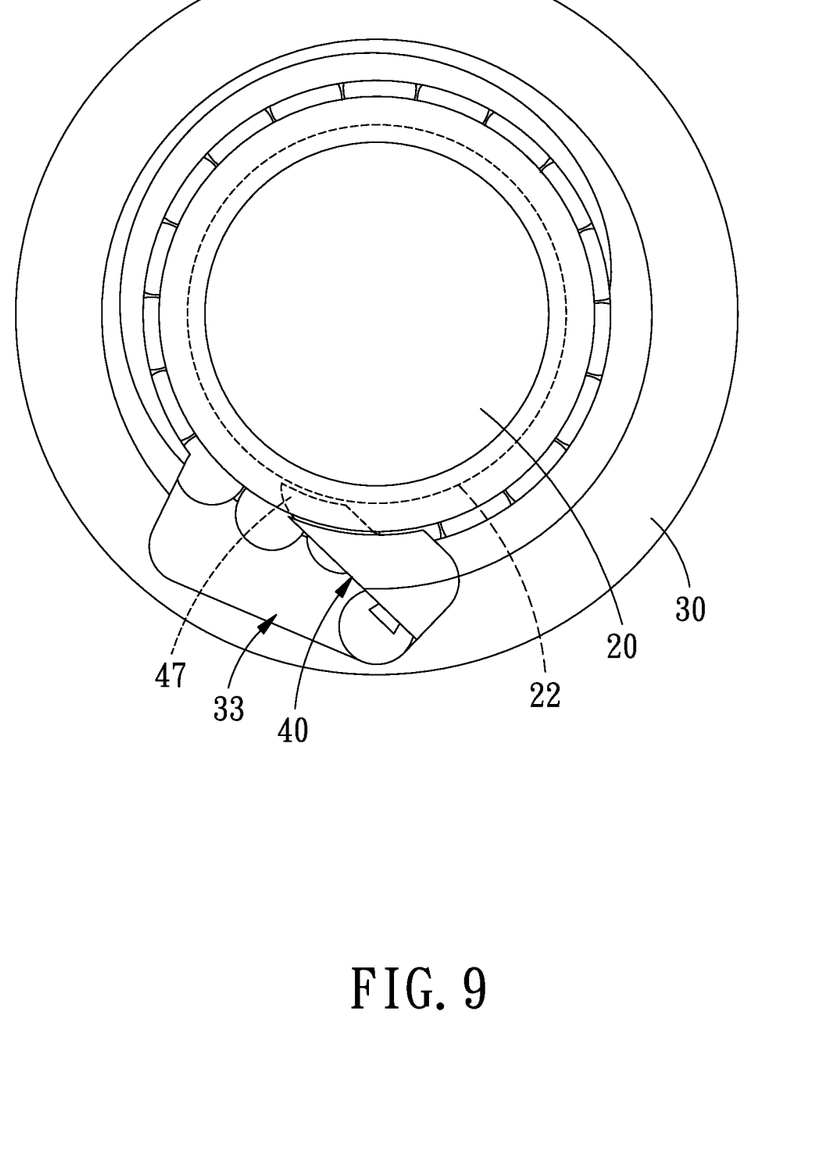
FIG. 9 is an operational view showing that the first circulating block is radially placed in the nut in accordance with the present invention and FIG. 10 is an operational view showing that the second circulating block is axially placed in the nut in accordance with the present invention.
Figure 10:
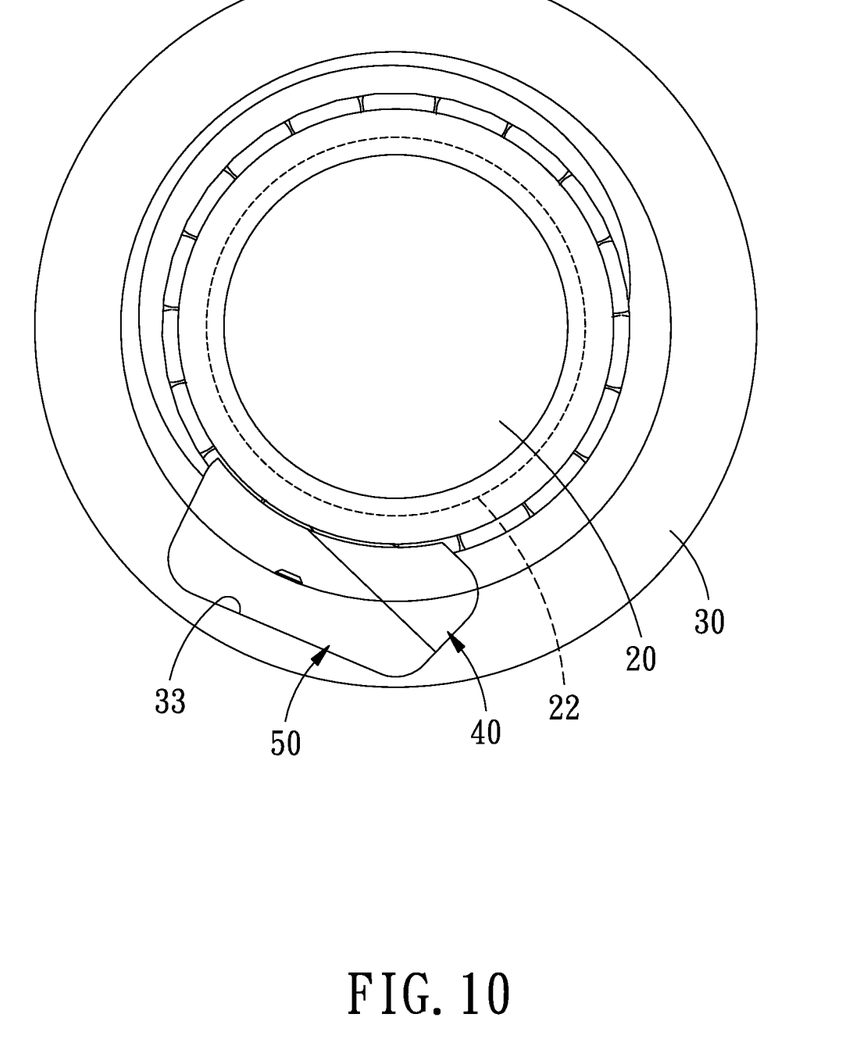

Referring to FIG. 8, in assembly, the nut 30 is mounted on the screw shaft 20 first, and next, the first circulating block 40 will be deflected slightly in the radial direction of the nut 30 for preventing the nail portion 47 from interfering with the screw shaft 20 and then placed into the recess 33 of the nut 30. Referring to FIG. 9, when the first abutting surface 43 of the first circulating block 40 abuts against the side surface 332 of the recess 33, the first circulating block 40 will be deflected in the radial direction of the nut 30 an angle to make the nail portion 47 be disposed inside the outer helical groove 22 of the screw shaft 20. After that, as shown in FIG. 10, the second circulating block 50 will be placed in the recess 33 of the nut 30 in the axial direction of the nut 30 and combined to the first circulating block 40 by engaging the positioning concave 55 of the second circulating block 50 with the positioning portion 45 of the first circulating block 40. Finally, the screw 59 is inserted through the locking hole 581 in the protruding ear 58 of the second circulating block 50 and screwed with the nut 30, so that the circulating assembly can be stably located in the recess 33 of the nut 30. With the above assembling method, the present invention can avoid interference with the thread of the screw shaft and can be applied to the screw shaft 20 whose helical groove doesn't extend to the shoulder portion thereof, thus widening the application range of the ball screw.

2. The present invention is applicable to nuts with smaller outer diameter:

The present invention specially aims at the angle design of the circulating assembly, in other words, the angle A between the bottom surface 52 of the second circulating block 50 and the second dividing surface 51 is limited between 18 degrees and 25 degrees, and the first and the second circulating blocks 40, 50 are limited in height, in other words, the HC1 of the first circulating block 40 and the HC2 of the second circulating block 50 satisfy the relation: HC2>HC1, by such arrangements, the present invention is applicable to the nuts with the smaller outer diameter, especially to the nuts by European industrial standards, such as the nuts by Deutsche industry norm.

While we have shown and described various embodiments in accordance with the present invention, it is clear to those skilled in the art that further embodiments may be made without departing from the scope of the present invention.

What is claimed is:

1. A ball screw with a circulating assembly, comprising:
   a screw shaft including an axis and an outer helical groove in an outer surface thereof around the axis;
   a nut being mounted on the screw shaft along the axis of the screw shaft and including an inner helical groove in an inner surface thereof around the axis of the screw shaft, the inner helical groove cooperating with the outer helical groove to define a loaded path for receiving a plurality of balls, the nut further including a circulating hole in communication with the inner helical groove, and a recess which is formed in an end surface thereof along the axis of the screw shaft, the recess including a bottom surface opposite the outer helical groove and a side surface which the circulating hole penetrates;
   the circulating assembly being disposed in the recess of the nut along the axis of the screw shaft and divided into a first circulating block and a second circulating block, along the axis of the screw shaft, the first circulating block including a top surface, a first dividing surface opposite the top surface, a first curved surface connected between the top surface and the first dividing surface, a first circulating channel recessed into the first dividing surface toward the top surface of the first circulating block, and a nail portion disposed in the outer helical groove of the screw shaft and located on the first curved surface, the second circulating block including a second dividing surface which is planar and abuts against the first dividing surface, another bottom surface which is planar and abuts against the bottom surface of the recess, a second curved surface with the same curvature as the first curved surface, a second circulating channel recessed in the second dividing surface toward the another bottom surface, the first and second circulating channels being combined to form a circular circulating channel in communication with the circulating hole and the loaded path, a circular outer profile of the circular circulating channel being connected to the another bottom surface of the second circulating block, between the another bottom surface of the second circulating block and the second dividing surface of the second circulating block being defined an angle of 18 degrees to 25 degrees, a maximum distance between the first dividing surface and the top surface of the first circulating block being denoted as HC1 while another maximum distance between the second dividing surface and the another bottom surface of the second circulating block is denoted as HC2, and they satisfying the relation: HC2>HC1.

2. The ball screw with the circulating assembly as claimed in claim 1, wherein a second abutting surface abutting against the side surface of the recess is formed between the second dividing surface and the another bottom surface of the second circulating block, and a first abutting surface which is located on the same plane as the second abutting surface is formed between the first dividing surface and the top surface of the first circulating block.

3. The ball screw with the circulating, assembly as claimed in claim 2, wherein the first circulating block includes a first end surface opposite the first abutting surface, the second circulating block includes a second end surface which is opposite the second abutting surface and located on the same plane as the first end surface of the first circulating block.

4. The ball screw with the circulating assembly as claimed in claim 1, wherein the first circulating block is formed with a positioning portion protruding from the first dividing surface, and the second circulating block is formed with a positioning concave recessed in the second dividing surface toward the another bottom surface for engagement with the positioning portion.

5. The ball screw with the circulating assembly as claimed in claim 4, wherein the positioning portion of the first circulating block is a dovetail block, the positioning concave of the second circulating block is a dovetail groove.

6. The ball screw with the circulating assembly as claimed in claim 1, wherein the bottom surface of the recess includes a threaded groove, and the second circulating block further includes a protruding ear, the protruding ear includes a locking hole in alignment with the threaded groove of the nut, a screw is screwed into the threaded groove by cooperating with the locking hole of the protruding ear.

7. The ball screw with the circulating assembly as claimed in claim 1, wherein both ends of the outer helical groove of the screw shalt are closed.

* * * * *